No. 669,099. Patented Mar. 5, 1901.
A. POTTS.
PIN OR THE LIKE FOR SAFETY FASTENINGS.
(Application filed Mar. 5, 1900.)
(No Model.)
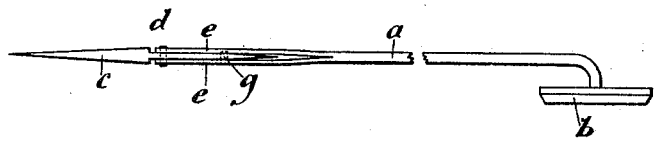
Fig: 1.
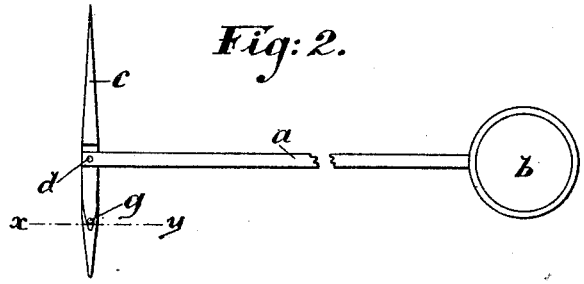
Fig: 2.
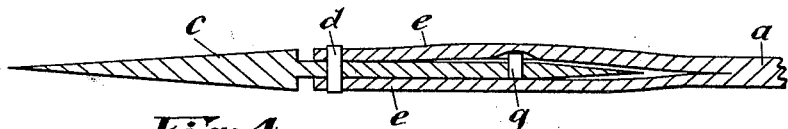
Fig: 3.
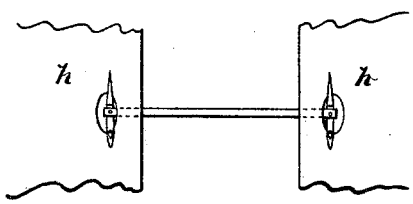
Fig: 4.
Fig: 5.
Witnesses:-
Benjamin Clark.
Charles H. Briggs.
Inventor:-
Arthur Potts.
per: E. Eaton.
His Attorney.
THE NORRIS PETERS CO., PHOTO-LITHO., WASHINGTON, D. C.

UNITED STATES PATENT OFFICE.

ARTHUR POTTS, OF DALSTON, ENGLAND.

PIN OR THE LIKE FOR SAFETY-FASTENINGS.

SPECIFICATION forming part of Letters Patent No. 669,099, dated March 5, 1901.

Application filed March 5, 1900. Serial No. 7,412. (No model.)

*To all whom it may concern:*

Be it known that I, ARTHUR POTTS, a subject of the Queen of Great Britain, and a resident of Dalston, in the county of Middlesex, England, have invented certain new and useful Improvements in Pins or the Like for Safety-Fastenings, (for which I have applied for patent in Great Britain, No. 21,481, dated October 27, 1899,) of which the following is a full, clear, and exact specification.

This invention consists of improvements in or relating to pins and the like for safety-fastenings.

The object of this invention is, such as in the case of a pin used in a tie, to render the same secure when placed in the tie and prevent the surreptitious withdrawal. My invention is also applicable to other uses in which a connection or fastening is required.

For purposes of illustration I will now refer to the annexed drawings, in which—

Figure 1 is a view of a tie-pin constructed according to my invention; Fig. 2, a view of same in securing position; Fig. 3, a view to enlarged scale, showing the principle of my invention; and Fig. 4, a view of modified arrangement. Fig. 5 represents a cross-section of the pin shown in Fig. 2 upon line X Y.

$a$ is what I term the "pin," attached to the jewel or other ornament $b$. The point $c$ of the pin is pivoted at $d$, so that it may be turned into the position shown in Fig. 2 for fastening purposes. The material of which the pin $a$ is made may be of a sufficiently elastic or springy nature so as to more or less clip the pivoted point $c$ in the position shown in Fig. 1—that is to say, the forks $e$ have a certain amount of play, so that when the stud or pin $g$ is brought into position between the forks $e$ and in alinement with what I term the "pin" $d$ it may enter a depression or recess and so clip or hold the movable point in position for insertion in a garment, and after the insertion in the garment the movable section may be turned into approximately the position shown in Fig. 2. Now it will be seen that when the pin is passed into a garment or through an aperture and the pivoted part $c$ caused to assume approximately the position shown in Fig. 2 the withdrawal of the pin will be retarded until the pivoted portion $c$ has been returned to the position shown in Fig. 1, when it may be withdrawn. It will also be seen that the essential principle in my invention is the turning of the end or point of the pin or such like into such a position as to offer an obstruction to its withdrawal in conjunction with the stud or pin, which engages in a recess or depression in one of the spring-forks aforesaid. Of course it will be understood that, although I have described my invention as applied to a tie-pin, it is equally applicable to brooches, coat-fastenings, and other uses, as the pivoted end of the pin or fastening may be passed through an aperture already prepared, and by causing the pivoted portion to assume the position shown in Fig. 4 its withdrawal will be prevented. In this case what I term the "pin" is provided at each end with forked portions carrying a pivoted piece aforesaid, this pivoted piece being turned into the position shown after having been passed through the prepared apertures in the garment $h$, or, if desired, the ends of the pin may be passed through the garment itself and then caused to assume the securing position.

Any convenient arrangement may be employed for clipping the pivoted portion in the required position. As an example, my invention might be applied to the securing of a garment around the wearer. The pin might be provided at both ends with the pivoted portion, and these ends may be passed through suitable apertures in the garment, and by causing the pivoted parts to assume the position shown in Fig. 2 the garment will be held as required, as the size of the aperture would be such as shown relative to the pivoted piece in Fig. 4. In the case of brooches one end of the pin will be pivoted to the brooch in any convenient manner and the other end caused to engage with the hook, as is usual, the pivoted section being free to be turned into the position shown in Fig. 2.

Having thus described my invention, what I claim, and desire to secure by Letters Patent, is—

In fasteners or connections of the class herein described in combination, a pin having a body portion provided with an elastic forked end, a pivoted section or point, the pivot bridging the forked ends whereby said pivoted section or point is carried between the elastic forks, a stud or pin projecting from one end of the pivoted section, a recess or depression in one of the spring-forks aforesaid for the engagement of the stud or pin for the purpose of maintaining the pivoted point normally in alinement with the pin aforesaid through the clipping action of the elastic forked ends of the pin.

In testimony that I claim the foregoing I have hereunto set my hand this 2d day of January, 1900.

ARTHUR POTTS.

Witnesses:
BENJAMIN CLARK,
RICHARD BUNDY.